Nov. 16, 1954 E. P. G. WRIGHT ET AL 2,694,752
TELECOMMUNICATION EXCHANGE
Filed Sept. 22, 1950 12 Sheets-Sheet 1
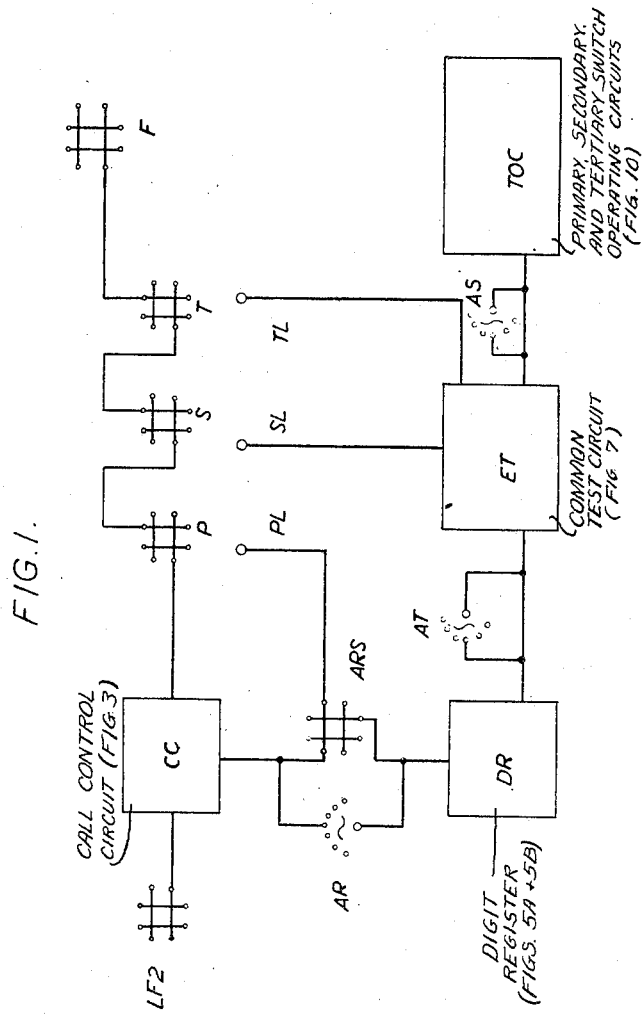
Inventors
ESMOND P. G. WRIGHT
DESMOND S. RIDLER
DONALD A. WEIR
JOSEPH RICE
By
Attorney

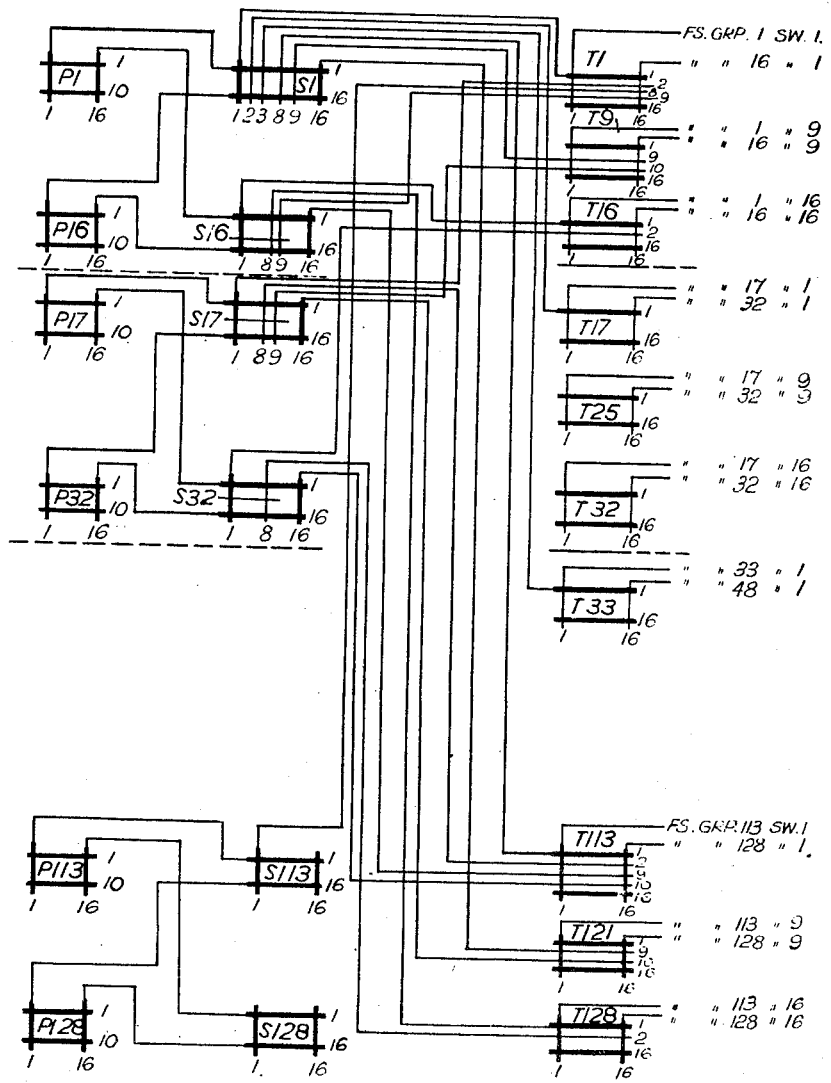

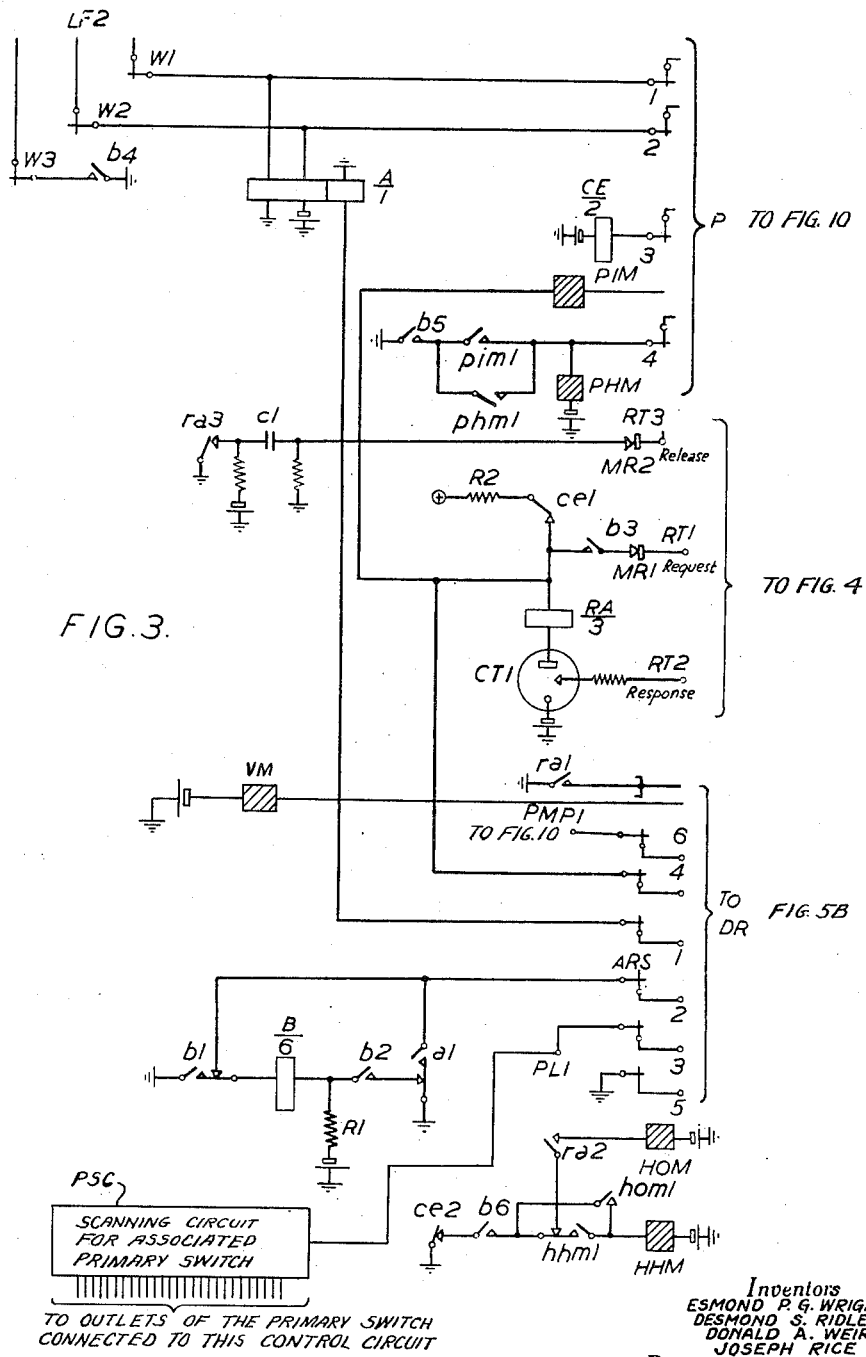

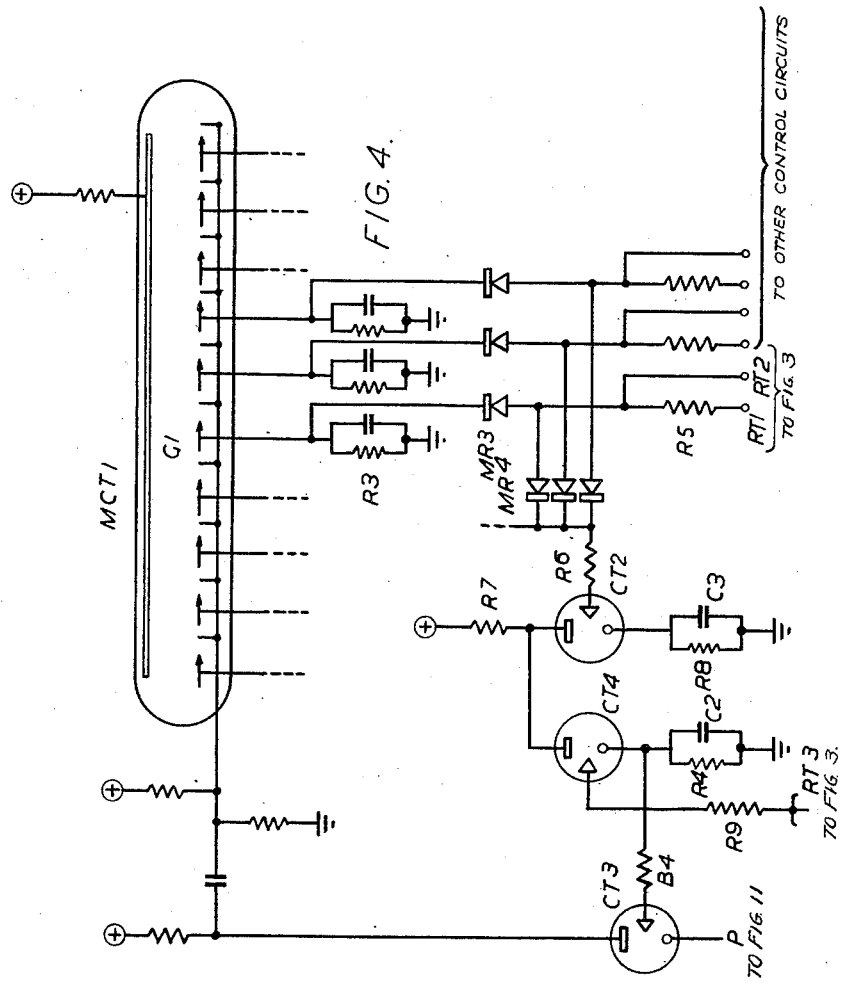

Nov. 16, 1954  E. P. G. WRIGHT ET AL  2,694,752
TELECOMMUNICATION EXCHANGE
Filed Sept. 22, 1950  12 Sheets-Sheet 5
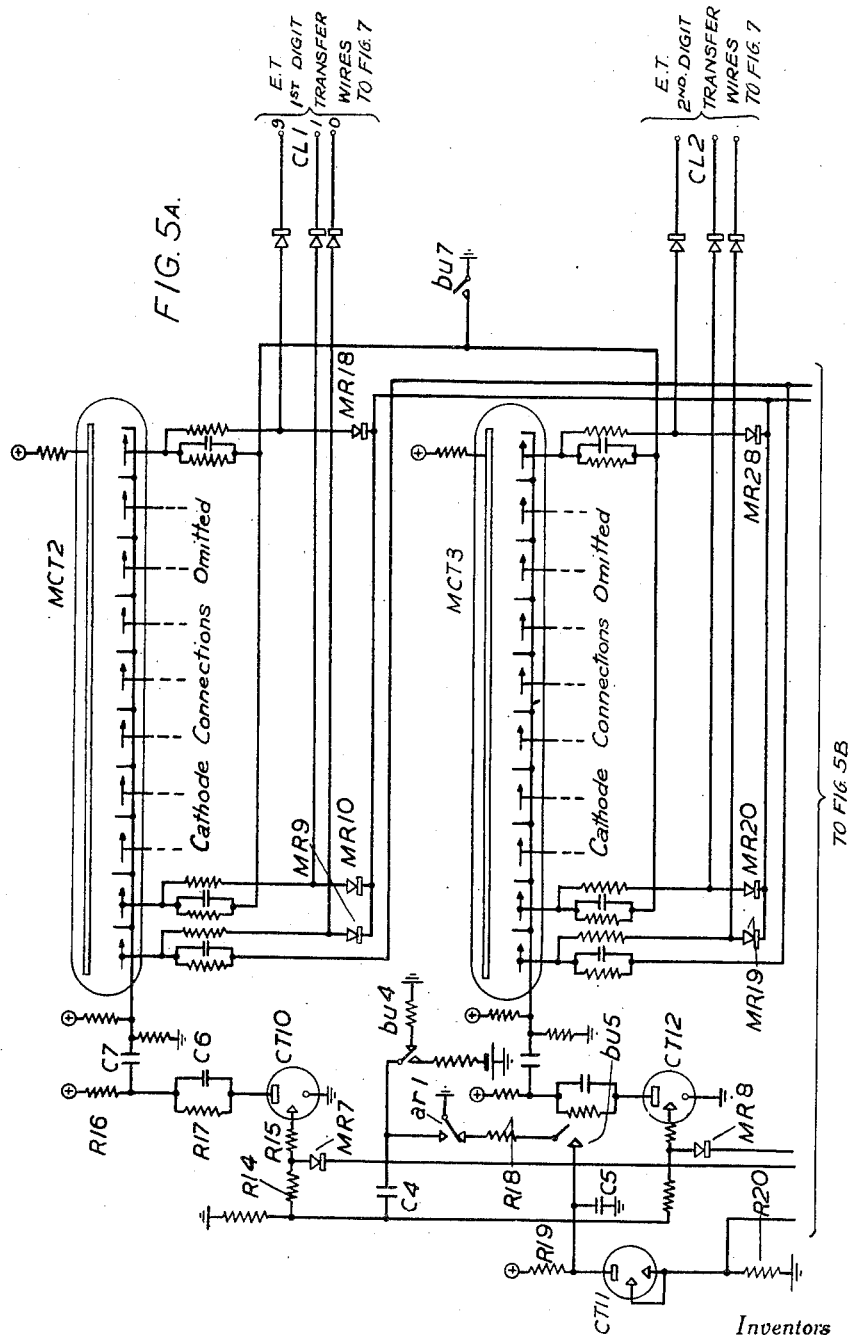
Inventors
ESMOND P. G. WRIGHT
DESMOND S. RIDLER
DONALD A. WEIR
JOSEPH RICE
By Robert T Harding Jr.
Attorney

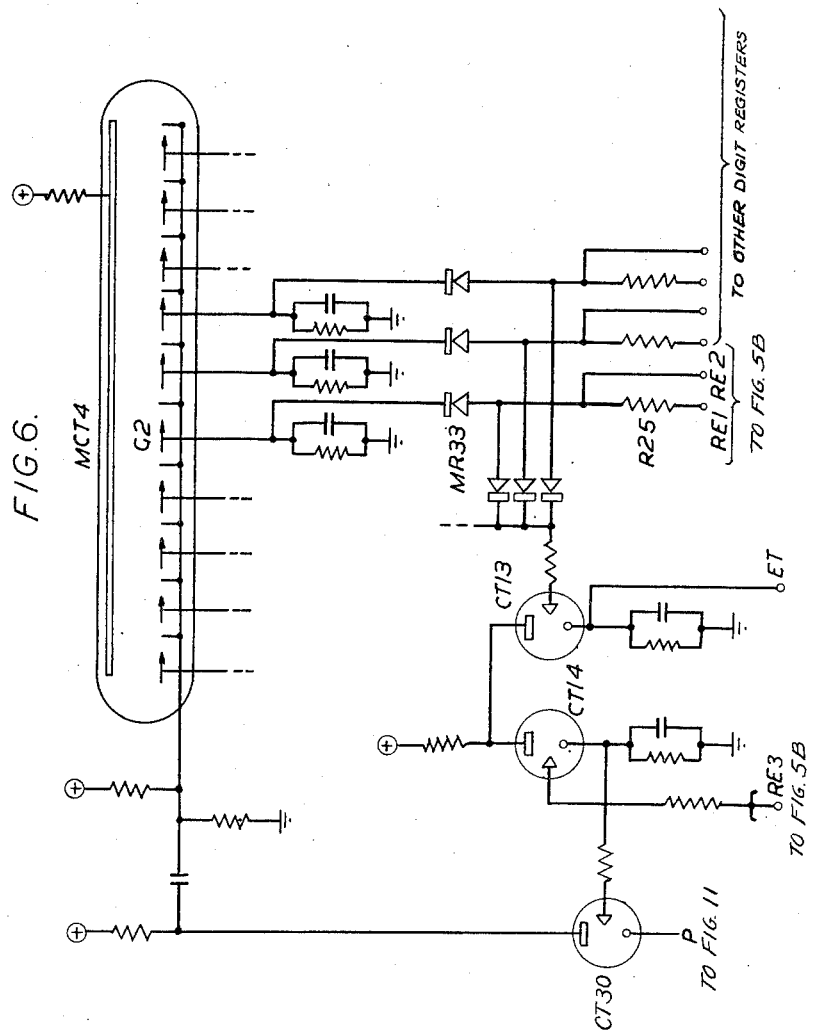

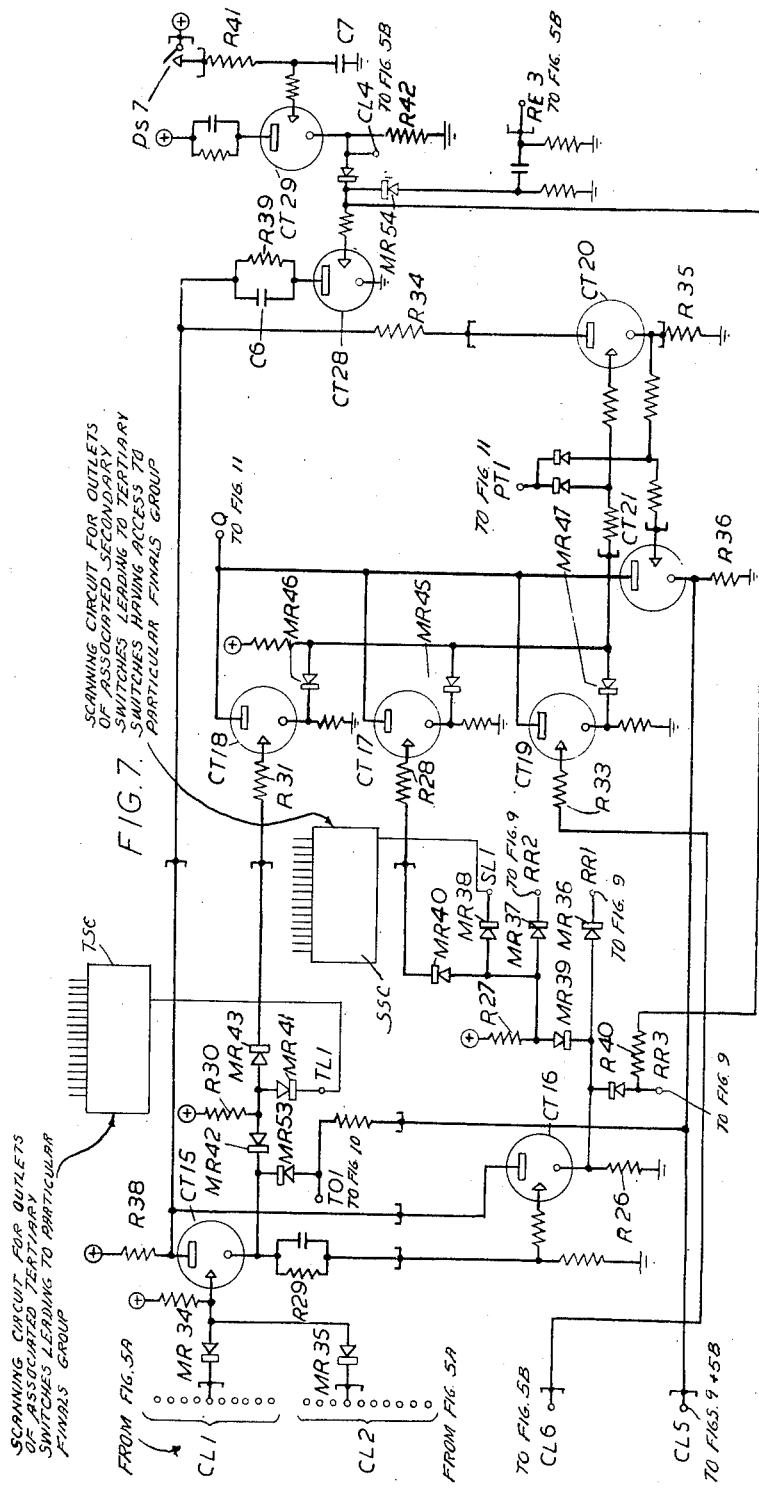

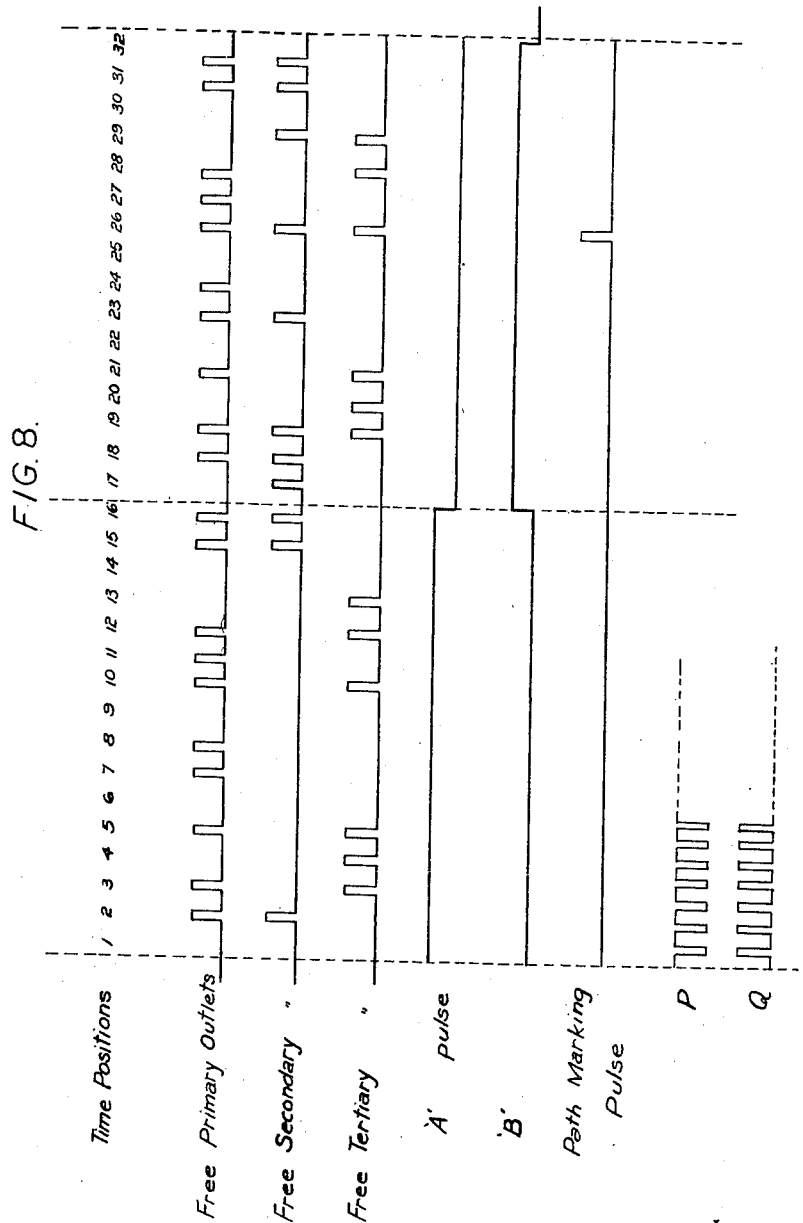

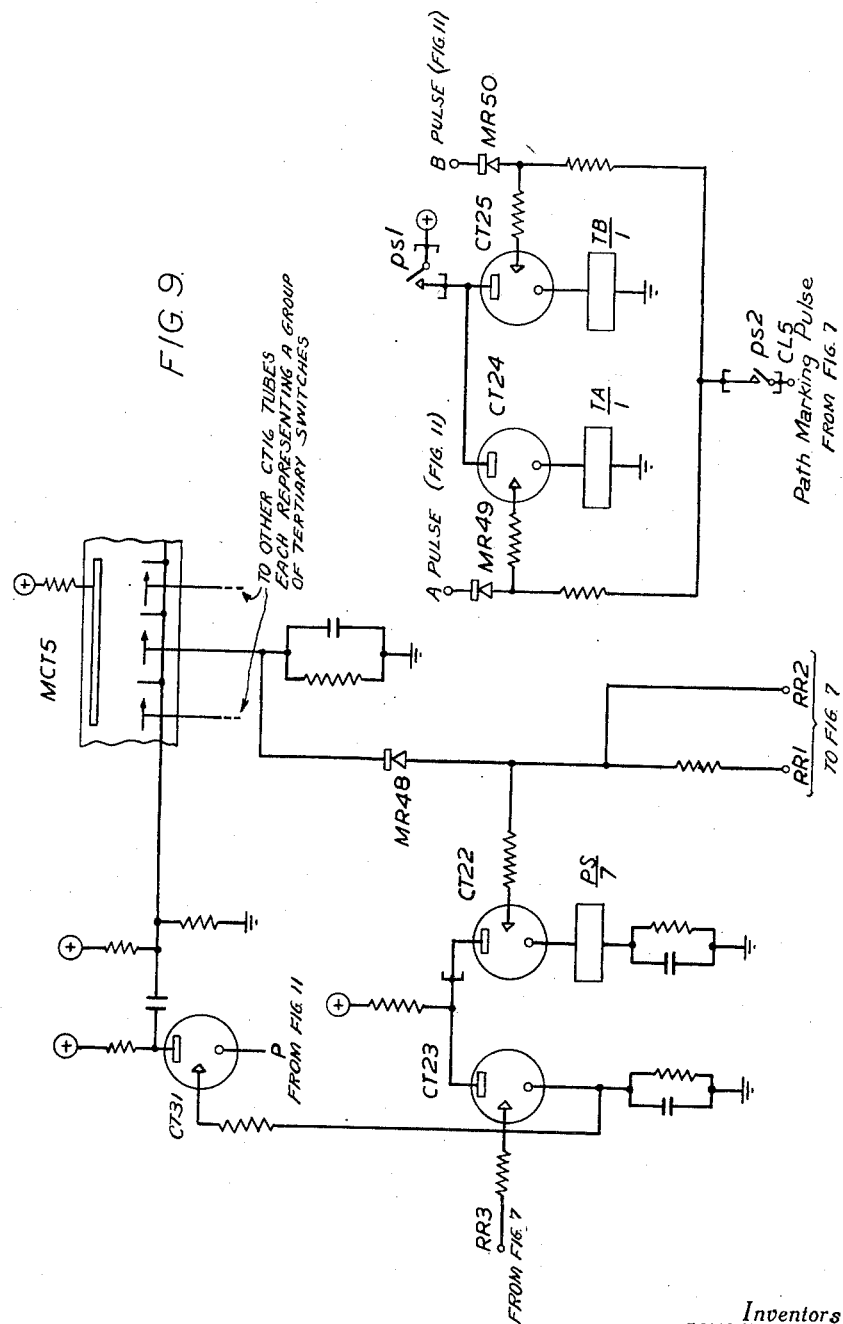

Nov. 16, 1954  E. P. G. WRIGHT ET AL  2,694,752
TELECOMMUNICATION EXCHANGE
Filed Sept. 22, 1950  12 Sheets-Sheet 11
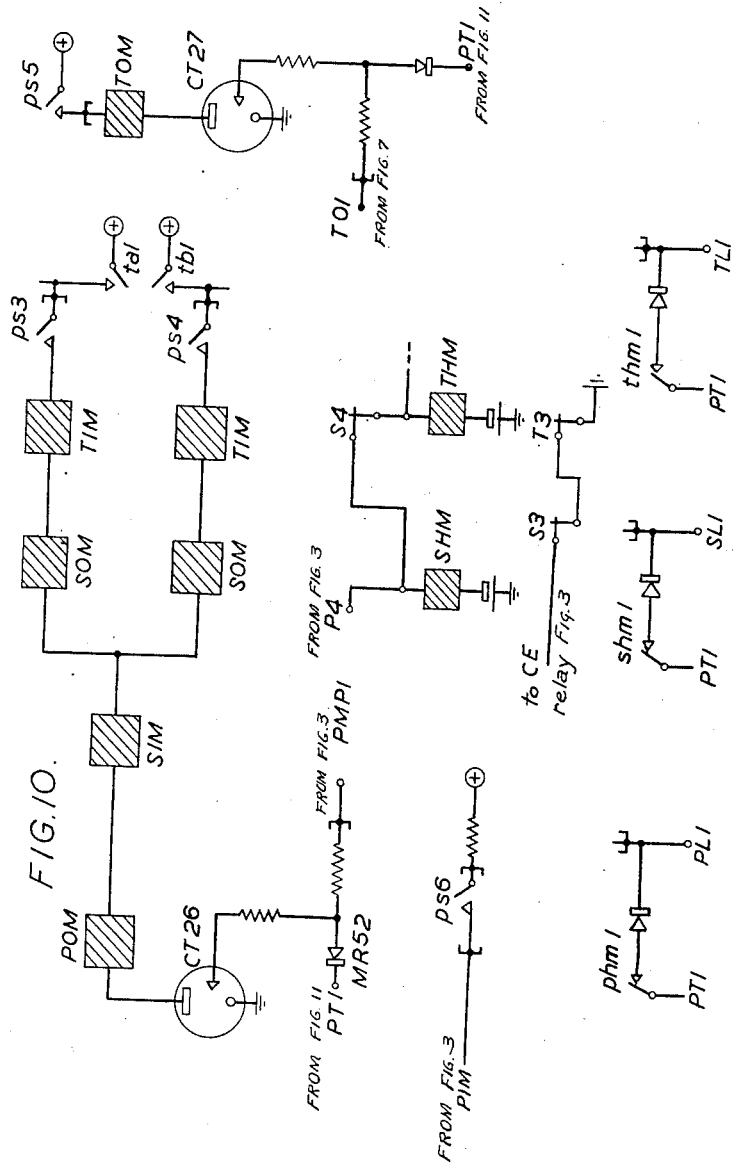
Inventors
ESMOND P. G. WRIGHT
DESMOND S. RIDLER
DONALD A. WEIR
JOSEPH RICE
By
Attorney Nov. 16, 1954 E. P. G. WRIGHT ET AL 2,694,752
TELECOMMUNICATION EXCHANGE
Filed Sept. 22, 1950 12 Sheets-Sheet 12
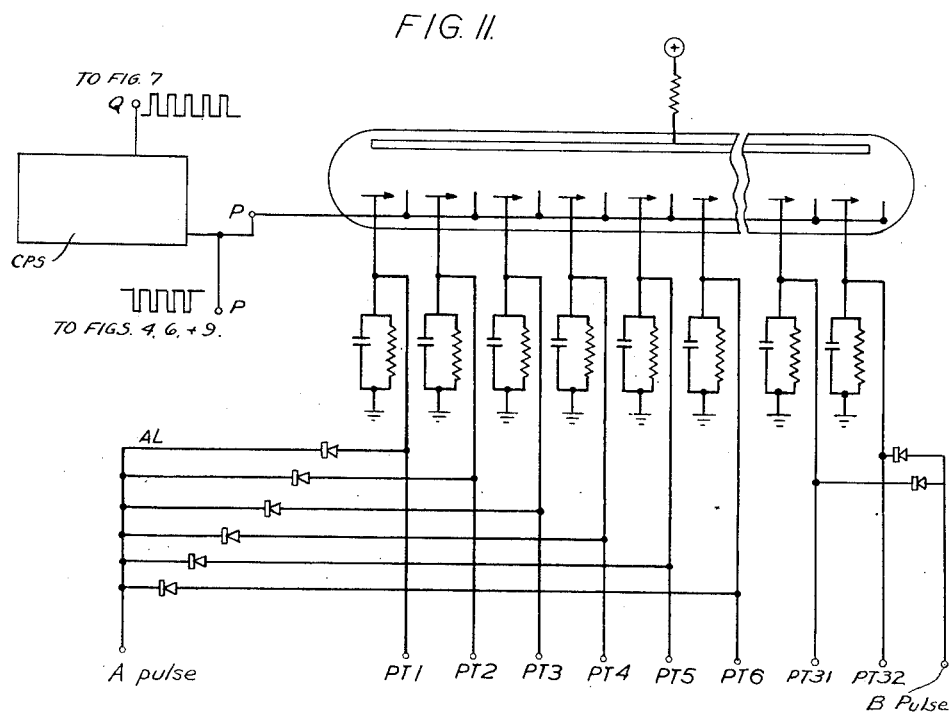
Inventors
ESMOND P. G. WRIGHT
DESMOND S. RIDLER
DONALD A. WEIR
JOSEPH RICE
By
Attorney

United States Patent Office 2,694,752
Patented Nov. 16, 1954

2,694,752

TELECOMMUNICATION EXCHANGE

Esmond Philip Goodwin Wright, Desmond Sydney Ridler, Donald Adams Weir, and Joseph Rice, London, England, assignors to International Standard Electric Corporation, New York, N. Y.

Application September 22, 1950, Serial No. 186,126

Claims priority, application Great Britain September 23, 1949

10 Claims. (Cl. 179—18)

This invention relates to automatic telecommunication switching systems, for instance, telephone or telegraph switching systems.

A first feature of the present invention comprises an automatic telecommunication switching equipment in which connections are established by means of a plurality of switching stages and in which a testing device is connected in sequence to the outlets from a first switching stage characterised in this that, in setting up a connection, the links accessible for the connection through one or each of a number of further switching stages are connected to a corresponding testing device or devices in conjunction with each of said outlets from said first switching stage in turn in link sequence, each constituting a path in the required direction.

According to a second feature of the invention an automatic telecommunication switching system comprises at least two switching stages and means at each stage for indicating the condition of a number of outlets on a test conductor common to said outlets, means for associating temporarily each said conductor with a registering device; means for testing via a plurality of test conductors at a plurality of successive stages, means for selecting, in accordance with incoming selective signals, outlets in a required direction at said successive stages, and means for completing a selected path through said selector stages simultaneously at all said plurality of stages.

According to a third feature of the invention an automatic telecommunication switching system comprises means for testing at one switching stage the availability of the outlets, characterised in this, that a single testing device is arranged to respond to the condition of the test conductors of a succession of outlets, each one appearing in a different selector multiple.

According to a fourth feature of the invention an automatic telecommunication switching system comprises means for testing at one switching stage the availability of the outlets, characterised in this, that a single testing device is arranged to respond to the condition of the test conductors of a succession of outlets, access to which can only be obtained via a different selector switch for each outlet.

According to a fifth feature of the invention an automatic telecommunication switching system comprises a number of incoming circuits and a number of outgoing circuits arranged in groups according to their outgoing direction, a plurality of switching stages arranged for series connection therebetween and means for testing the test conductors of outlets at each stage, characterised in this, that the said testing means test an outlet from each said switching stage in synchronism.

According to a sixth feature of the invention an automatic telecommunication switching system comprises a plurality of means for testing simultaneously a plurality of links constituting a complete path between an incoming circuit and an outgoing circuit and means for identifying a free path by the simultaneous response of said testing means.

According to a seventh feature of the invention an automatic telecommunication switching system comprises three successive switching stages through which a group of outlets designated by a plurality of digits is reached from an inlet, characterised in this, that a connection through the three stages may be made over any one of a plurality of possible paths and that a free outlet in said group and a free path thereto are simultaneously determined and the appropriate switches in each switching stage simultaneously operated to complete the connection therethrough.

The term "link" as used in the above statement and in the claims means a conversational channel between adjacent switching stages.

These and other features of the invention will be clearly understood from the following description of one embodiment thereof, read in conjunction with the accompanying drawings, in which the switches in each switching stage shown and described are of "cross-bar" type and in which:

Fig. 1 is a block schematic diagram of a telephone system and indicates the group selection stages of an automatic exchange and their controlling means.

Fig. 2 shows the wiring arrangement for interconnecting primary, secondary and tertiary switches comprising two group selection stages.

Figure 5B:
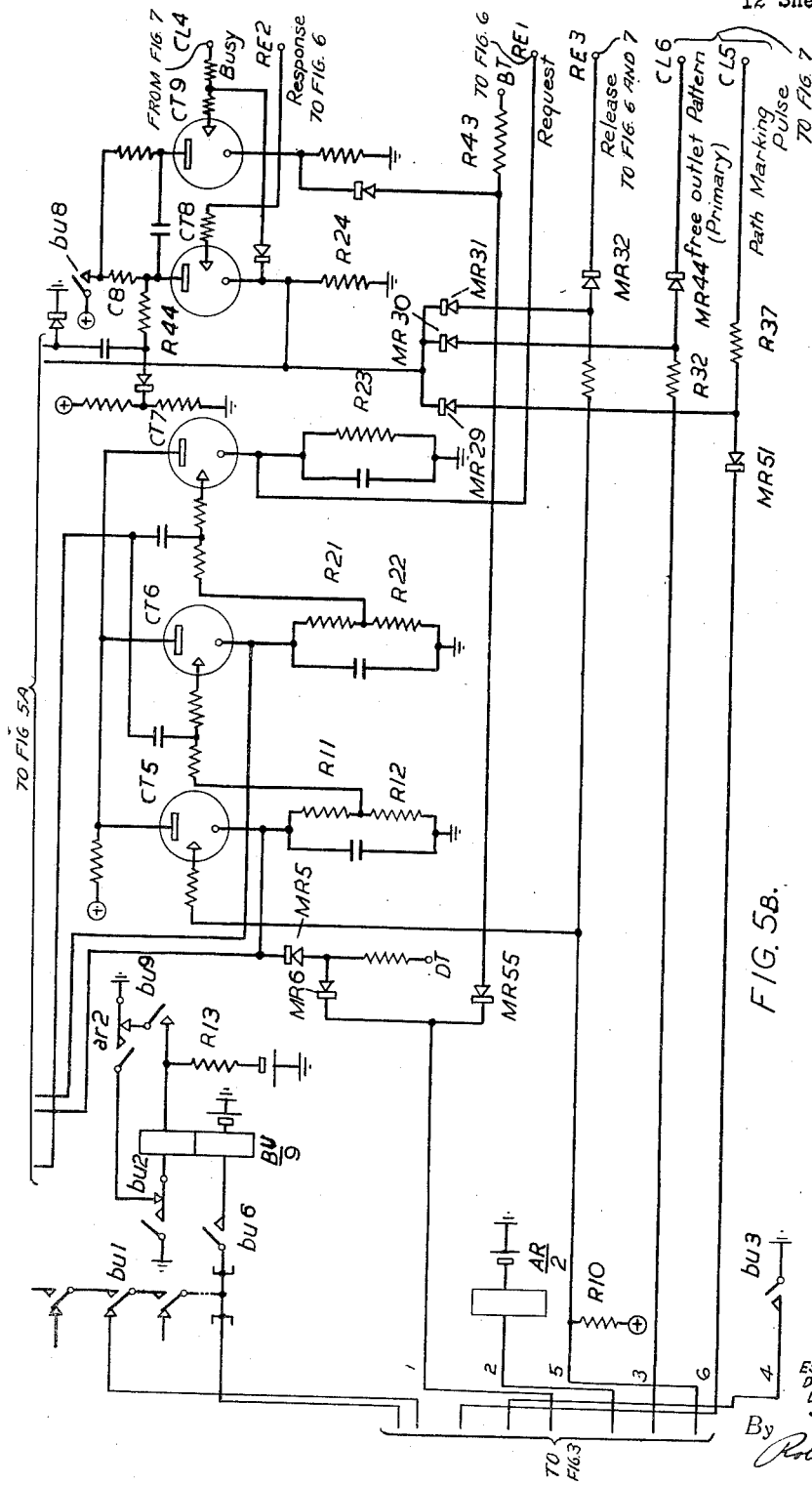

Fig. 3 gives a schematic view of the call control circuit and associater switch, respectively CC and ARS of Fig. 1.

Fig. 4 is the associator linking the call control circuit and the digit register. It is AR of Fig. 1.

Figs. 5A and 5B together shows the digit register DR.

Fig. 6 is the associator AT used for linking the digit register with the common electronic test circuit.

Fig. 7 is a diagram of the electronic test circuit indicated in Fig. 1 as ET.

Fig. 8 shows marking pulses used in various parts of the circuits for testing the availability of outlets of different switches.

Fig. 9 is the circuit arrangement of the associating circuit AS between the electronic test means and the tertiary switch operating circuit.

Fig. 10 contains the operating circuits for the primary, secondary and tertiary group selection switches.

Fig. 11 provides the pulse generating arrangement.

Referring first to Fig. 1 a second line finder over which an incoming call is received is indicated at LF2. CC is a call control circuit which includes supervisory relays and a transmission bridge. This circuit is connected via an associator AR to a digit register DR, which is one of a number provided. DR in turn is associated over a common path under control of an associator AT with an electronic test circuit ET.

The group selection stages comprise primary, secondary and tertiary switches P, S and T respectively arranged for simultaneous testing. The test leads SL and TL from the secondary and tertiary switches are taken directly to the test circuit ET while the lead PL is taken to ET via an associator switch ARS and the digit register DR, the reason for this difference being explained below. TOC is a separate circuit for operating the tertiary switches. Other selection stages may follow the tertiary switch T, but in the system now to be described in detail the tertiary is followed by a final switch F.

PRIMARY-SECONDARY-TERTIARY GROUP SELECTION STAGES

The P, S and T switches shown in Fig. 1 are positioned under control of the first two digits of a called number. The manner of such setting will now be given in some detail, reference first being required to Fig. 2 for the interconnections or links between these switches.

In the embodiment shown, cross-bar type primary switches having ten inlets and sixteen outlets are employed, whilst the secondary and tertiary switches have sixteen inlets and sixteen outlets. With such an arrangement a complete primary-secondary-tertiary unit, as shown in Fig. 2, comprises eight groups of primaries each containing 16 switches. In like manner the secondaries and tertiaries are in 8 groups of 16 switches. It is possible therefore to connect 12,800 lines to the primaries, selectively through the line finders, and to reach 128 groups of finals from the tertiaries.

P1–P16 form the first group of primary switches to the inlet side of which 1600 lines may be connected, the next 1600 lines being connected to switches P17–P32, and so on. In like manner the secondary switches are divided into groups S1–S16, S17–S32 . . . S113–S128 and the tertiary switches into groups T1–T16, T17–T32 . . . T113–T128.

In practice, and as will be described in connection with the remaining figures, an exchange having a maximum subscriber capacity of 10,000 lines is found convenient from a line numbering and designating point of view. The number of primary groups and, therefore, secondary and tertiary groups required would be dependent upon the traffic and the line finder arrangement.

The wiring between primary and secondary switches is so arranged that, within one group, primary outlets are connected to secondary switches of corresponding number and secondary inlets are connected to primary switches of corresponding number e. g. the first outlet of P16 is connected to S1 on the sixteenth inlet. Primary and secondary switches of different groups are never associated with one another.

The arrangement between secondary and tertiary switches is such that every switch of every group of secondaries has access to every group of tertiaries. Thus outlets 1–8 from S1 go to the first inlets on T1, T17, T33, T49, T65, T81, T97 and T113 while the outlets 1–8 from S2 go to the first inlets on T2, T18, T34, T50, T66, T82, T98, T114, and so on for switches S3–S16. The switches S17–S32 which are the second groups of secondaries, go in like manner to the second inlets of the same tertiaries. Thus the outlets 1–8 from any secondary switch are taken to a tertiary group of the corresponding number and connections to these groups are repeated for outlets 9–16, while inlets 1–8 of each tertiary switch are taken to the corresponding primary-secondary group and the 9–16 inlets repeat these connections.

In Fig. 1 it should be understood that switches P and S belong to one primary-secondary group and that the T switch belongs to the particular tertiary group dependent upon the routing of the call.

It will readily be seen from Fig. 2 and the above explanation that from any line, that is to say any inlet on a primary switch, there are thirty-two possible routes to a particular tertiary group, e. g. from P1 inlet 1 to the first tertiary group (leading to final groups 1–16) there are 16 paths from P1 to S1–S16, one to each, and from each of these 16 switches there are 2 alternative paths to switches T1–T16, as has been stated above.

Each tertiary switch gives access to sixteen final selectors dealing with a hundred subscribers and P. B. X lines. Tertiary levels additional to those required for a fully equipped exchange may be connected to junction relay sets.

It has already been stated that simultaneous testing of the P, S and T switches is carried out and this will now be explained in more detail. Assume that a path is required from an inlet of P1 to the first final selector group, and therefore to the first tertiary group. As the call is to be extended from P1, a free path found must necessarily pass through a first inlet on any of the switches S1 to S16 and the condition of these must therefore all be tested. Furthermore, since the call is to the first tertiary group, the two paths from outlets 1 and 9 on each of these secondary switches must also be tested. The first outlet on each switch of the first tertiary group leads to the wanted final first group, so that the condition of these outlets also must be tested.

Below is listed the thirty-two tests which may need to be carried out before a free path is found, assuming that there is one such path. The conditions of the path at each of three testing positions are tested simultaneously.

| Primary Outlet No. | Switch | Secondary Outlet No. | Switch | Tertiary Outlet No. | Switch |
|---|---|---|---|---|---|
| 1 | P1 | 1 | S1 | 1 | T1 |
| 1 | P1 | 9 | S1 | 1 | T9 |
| 2 | P1 | 1 | S2 | 1 | T2 |
| 2 | P1 | 9 | S2 | 1 | T10 |
| 3 | P1 | 1 | S3 | 1 | T3 |
| 3 | P1 | 9 | S3 | 1 | T11 |
| 4 | P1 | 1 | S4 | 1 | T4 |
| 4 | P1 | 9 | S4 | 1 | T12 |
| 5 | P1 | 1 | S5 | 1 | T5 |
| 5 | P1 | 9 | S5 | 1 | T13 |
| 6 | P1 | 1 | S6 | 1 | T6 |
| 6 | P1 | 9 | S6 | 1 | T14 |
| 7 | P1 | 1 | S7 | 1 | T7 |
| 7 | P1 | 9 | S7 | 1 | T15 |
| 8 | P1 | 1 | S8 | 1 | T8 |
| 8 | P1 | 9 | S8 | 1 | T16 |
| 9 | P1 | 1 | S9 | 1 | T9 |
| 9 | P1 | 9 | S9 | 1 | T8 |
| 10 | P1 | 1 | S10 | 1 | T10 |
| 10 | P1 | 9 | S10 | 1 | T7 |
| 11 | P1 | 1 | S11 | 1 | T11 |
| 11 | P1 | 9 | S11 | 1 | T6 |
| 12 | P1 | 1 | S12 | 1 | T12 |
| 12 | P1 | 9 | S12 | 1 | T5 |
| 13 | P1 | 1 | S13 | 1 | T13 |
| 13 | P1 | 9 | S13 | 1 | T4 |
| 14 | P1 | 1 | S14 | 1 | T14 |
| 14 | P1 | 9 | S14 | 1 | T3 |
| 15 | P1 | 1 | S15 | 1 | T15 |
| 15 | P1 | 9 | S15 | 1 | T2 |
| 16 | P1 | 1 | S16 | 1 | T16 |
| 16 | P1 | 9 | S16 | 1 | T1 |

MODE OF OPERATION OF CONTROLLING CIRCUITS

Returning now to Fig. 1 a brief outline will be given of the functions to be performed by the various controlling circuits.

A calling subscriber is connected to the control circuit CC over first and second line finders in known fashion. A digit register DR is thereupon taken into use through the associator AR and dial tone is transmitted to the subscriber. The first two dialled digits are received and stored in the register DR and on completion of the second digit the common electronic test circuit ET is associated with the register DR by means of the associator AT. A particular element in the test circuit ET reacts upon receipt from DR of the information stored, thereupon defining the wanted final group and thereby the tertiary group also. The appropriate tertiary operating circuit TOC is then associated by means of the associator AS. The outlet conditions from the relevant testing positions, such as those given in the table above, are connected to the test circuit ET over the leads PL, SL and TL. These conditions are transmitted as time displaced pulses. A free condition occurring simultaneously on all three test leads indicates an available free path and the test circuit ET immediately responds, positioning correctly the switches P, S and T.

The testing and setting up of these switching stages occurs in the time interval between the second and third digits. On completion of this part of the connection the digit register DR and the test circuit ET and TOC are released and the further establishment of the call proceeds, the final selector being controlled directly by the dialled impulses.

The high speed of testing enables the testing for a free path to be limited to one call per group at any one time. This eliminates the need for conventional double test features.

SETTING UP OF A CONNECTION

(1) *Initiation of a call*

Part of the second line finder LF2, the call control circuit CC, part of the primary switch P, and part of the associator AR are all shown in Fig. 3.

A calling subscriber extends his loop over terminals W1 and W2 to operate relay A. Contact a1 up operates relay B via b1 and R1. Relay B locks itself over b1 up. Contact b4 up extends busy condition over terminal W3 to the line finder circuit. Contact b5 up prepares the circuit for the operate and hold magnets of the P switch and the operation of b2 prepares the circuit for the release of relay B. The operation of contact b3 applies a positive potential over R2, contact ce1 back and rectifier MR1 to terminal RT1. This potential acts as a request signal to the digit register associator AR, shown in Fig. 4. The purpose of this associator is to permit only one control circuit to function at a time. When AR is connected, a response signal potential is received on terminal RT2 which triggers tube CT1. This tube on striking operates relay RA. Contact ra1 up applies an earth potential to a common lead which extends to Fig. 5B and after passing over a chain of busy contacts returns to the control circuit of Fig. 3 and effects the seizure of a digit register by operating a vertical magnet VM of the switch ARS, thus setting the switch ARS of associator AR. The horizontal operate magnet HOM (Fig. 3) of the crossbar switch ARS is operated over ce2 back, b6 up, spring hhm1, ra2 up to close the contacts of the switch. HOM operating closes springs hom1 to complete the operating circuit for the hold magnet HHM which locks itself over hhm1 up. The operation of HHM releases the operate magnet HOM, but holds the already closed contacts in their closed position. A connection is thus established between the call control circuit CC of Fig. 3 and the associated digit register DR of Figs. 5A and 5B. Dial tone is returned from DR from terminal DT over rectifier MR6 and terminal 1 of switch ARS and is transmitted to the subscriber through the A relay. The closing of the switch ARS causes the operation of relay AR in Fig. 5A over lead 2, contact of the switch, a1 up, ground. At ar2 a circuit is closed for relay BU which locks over contact bu2. An earth potential from DR over bu3 up and lead 4 of switch ARS releases relay RA by short circuiting its winding. The closure of ra3 on release of the relay effects the application of a pulse to terminal RT3 by the charge and subsequent discharge of condenser C1 through the rectifier MR2. This pulse ensures the release of the associator AR, shown in Fig. 4, and later described in detail, so that it is free to establish a subsequent connection between another control circuit CC and a second digit register DR.

Turning now to the operation of the associator AR, see Fig. 4, the positive request potential applied over terminal RT1 is fed to the control electrode of the gas discharge tube CT2 but is normally short circuited by the rectifier MR3 in series with R3 to ground. MCT1 is a multi-cathode tube of the kind particularly described in U. S. Patent No. 2,553,585. Negative pulses are applied to the commoned transfer electrodes of MCT1 through the main gap of the gas discharge tube CT3 which itself is fed with negative pulses at the point P and is triggered by positive potential across R4 due to the normally conducting condition of the gas tube CT4. Thus MCT1 is continuously pulse stepped. Each cathode of the tube MCT1 is individual to a particular control circuit so that a discharge in the anode/cathode gap G1 produces a potential drop across the resistance R3. This potential if occurring coincidentally with an applied potential over RT1 blocks the rectifier MR3 causing the RT1 potential to trigger the tube CT2 through R5, MR4, and R6 in series. The conduction of the tube CT2 extinguishes the tube CT4 due to the action of the common anode resistance R7 and the parallel RC networks R4, C2, R8, C3. The extinction of CT4 removes the trigger potential from CT3, so that the discharge in the tube MCT1 remains at G1. The positive potential now existing at the junction MR3/R5 is fed to terminal RT2 and from there to the tube CT1, as previously described. The positive release pulse applied over terminal RT3 on the release of relay RA (Fig. 3), triggers the tube CT4 through R9, so restoring the initial condition with MCT1 stepping and CT2 extinguished.

Figs. 5A and 5B show the circuit of the digit register DR. The reception of each digit steps the digit tube counting chain comprising the gas tubes CT5 and CT7 but initially the tube CT5 only is conducting because of the positive potential applied to its control electrode over R10. With CT5 conducting a potential appears across R11 and R12 in series blocking rectifier MR5, so that dial tone DT is connected to the calling line through MR6 and terminal 1 of switch ARS.

The digit register busy chain for the operation of the vertical operate magnet referred to above, will now be described in detail. The busy relay BU when operated extends the busy chain by a contact bu1 up to a vertical magnet of a following free digit register. The manner of operation of relay BU follows the operation of relay AR by the application of an earth over a1 up in a calling control circuit CC (only one of which may be operated at once), and the application of earth over ra1 up operates a free digit register's vertical magnet VM of switch ARS through operated BU relay contacts of other digits registers. BU locks over bu2 and R13. bu3 up applies earth over contact 4 of switch ARS to release RA (Fig. 3). bu4 up connects negative battery to condenser C4 (Fig. 5A), whilst bu5 up prepares a discharge circuit of condenser C5, and bu6 up connects BU to the common lead and ensures that BU relay will be unable to release while an RA contact (Fig. 3) is operated. bu7 (Fig. 5A) up connects earth to the cathodes 1–9 of the tubes MCT2 and MCT3 which are normally conducting in their first or 0 cathodes, and bu8 (Fig. 5B) up provides an anode supply to tubes CT8 and CT9.

(2) *Digits received in digit register*

The relay A (Fig. 3) follows the subscriber's dialled digits, and via a1 relay AR (Fig. 5B) does likewise. The release and subsequent re-operation of relay AR on the first impulse discharges C4 (Fig. 5A), causing a positive pulse to be applied to the trigger electrode of CT10 over R14 and R15 in series, MR7 being blocked by the potential across R11 and R12 (Fig. 5B). CT10 fires, causing condenser C6 to be charged through R16, and passing a negative pulse to the commoned transfer electrodes of the tube MCT2 through C7 and so stepping the discharge within the tube to the second anode/cathode gap which is cathode No. 1. R17 is of such value that CT10 cannot remain in a discharging condition, so that it extinguishes and C6 discharges through R17. Successive re-operations of ar1, as AR follows the first digit, step the MCT2 discharge to a gap corresponding to the dialled digit.

The first release of AR discharges C5 through bu5 up, R18, and extinguishes the normally conducting tube CT11. The time constant of the circuit R19, C5 is longer than the time interval between successive dial pulses, so that CT11 does not re-fire until the end of the first dialled digit. On firing again a pulse is generated across the cathode resistance R20 and applied to trigger the tube CT6 which has been primed from CT5 which extinguishes when CT6 fires.

The potential developed across R21 and R22 in series blocks the rectifier MR8 (Fig. 5A), causing the second digital pulse train to be routed to the tube CT12 and MCT3, in like manner of the first train to CT10 and MCT2. The removal of potential across R11 and R12 when CT5 ceases to conduct, unblocks rectifiers MR7 and MR5. The latter prevents dial tone from being extended to the subscriber subsequent to this stage.

The operation of CT11 on the completion of receipt and registration of the two first digits supplies a pulse to operate CT7 and thereby extinguish CT6. A potential appearing across resistance R23 is used as a request potential at terminal RE1, for the connection to DR of the electronic test circuit ET (Fig. 7) via the associator AT (Fig. 6), in a manner to be explained. On the allocation of ET to this DR a response potential is applied to terminal RE2 and tube CT8 is triggered. The consequent potential drop across R24 raises the potential on the positive plates of rectifiers MR9 to MR18, MR19 to MR28 and MR29 to MR31. The blocking of rectifiers MR9 to MR18 allows the potential on that cathode discharging in response to the first digit to be passed to ET over the appropriate lead in the common group CL1. Similarly the second digit is transferred over a lead of the CL2 group. Thus, only one register at a time can pass potentials on leads CL1 and CL2 to the common test circuit of Fig. 7. The blocking of rectifiers MR29 and MR30 frees the leads CL5 and CL6 for passage of information backwards and forwards respectively in a manner described more fully below. MR31 blocked prepares for the release of ET by a circuit through MR32.

(3) *Association of electronic test circuit with operated digit register*

The associator AT (Fig. 6) has for its purpose to permit only one register at a time to affect the common test circuit of Fig. 7. It receives a positive potential over terminal RE1. This is applied to tube CT13 to trigger it when there is a coincident pulse due to discharge of gap G2 of tube MCT4, blocking rectifier MR33 in a manner analogous to that previously described for AR above. Tube MCT4 is stopped on the cathode associated with the digit register which is wanting the electronic test circuit. The potential appearing at the junction of resistance R25 and rectifier MR33 is applied to terminal RE2 to trigger tube CT8 (Fig. 5B), as previously described. The release of ET and AT is effected later by the firing of tube CT14 when the switching operations are completed.

(4) *Operation of electronic test circuit*

There is present on one of the leads of the group CL1 (Figs. 5A and 7), a positive potential indicative of the first digit, and similarly in the group CL2 for the second digit. These potentials co-operate to trigger one of a hundred gas discharge tubes in the electronic test circuit, one of which, CT15, is shown. The potentials are applied over the rectifiers MR34 and MR35.

Each tube such as CT15 represents a particular finals group. As shown in Fig. 7, CT15 represents finals group "54." Referring back for a moment to Fig. 2 the first group of 16 tertiary switches gives access to the sixteen groups of finals 1–16 and the fourth group (not shown) gives access to finals groups 49–64. Returning now to Fig. 7, the cathode of tube CT15 and the cathodes of the fifteen other tubes like CT15 and representing the other finals groups in 49–64 are fed in common to the trigger electrode of a gas tube CT16, this being representative of the tertiary switch group having access to finals groups 49–64 and there being other gas tubes, like CT16, for the other tertiary groups.

CT16 will fire following the striking of CT15, and a potential across the cathode resistance R26 applies a request potential to the appropriate associator AS (Fig. 9) for the association of the wanted tertiary group test circuit TOC over rectifier MR36 and terminal RR1. When the tertiary group test circuit becomes available, i. e. when the discharge in tube MCT5 of associator circuit AS (Fig. 9) steps to the terminal to which RR1 and RR2 are connected, a response potential is applied to terminal RR2, blocking rectifier MR37.

The primary, secondary and tertiary switches are each arranged with scanning circuits PSC (Fig. 3), SSC (Fig. 7), and TSC (Fig. 7), respectively, to transmit pulse trains over the leads PL, SL and TL (Figs. 1, 3, and 7). These scanning circuits may be similar to those disclosed in United States Patent No. 2,563,589 to M. den Hertog.

Each primary switch has a scanning circuit PSC scanning its 16 outlets. Each group of secondary outlets from all secondary switches leading to a group of tertiary switches having access to a different group of final selectors has a scanning circuit SSC, and since there are two outlets from each secondary switch leading to tertiary switches having access to a particular finals group, there will be 32 outlets to be scanned by circuit SSC in each group of secondary outlets. Each group of outlets of tertiary switches leading to a different final selector group has a scanning circuit TSC, and since each tertiary switch of a group of 16 tertiary switches has a single outlet leading to a final selector group, there will be 16 outlets to be scanned by the circuit TSC in each group of tertiary outlets. Thirty-two pulse positions are included in each train and the presence of a pulse at any position indicates the availability of an outlet for switching purposes. Three corresponding trains on PL, SL and TL provide, in order, a pattern of the free or busy condition of the outlets listed in the table above. A typical example of three simultaneous trains is shown in Fig. 8. The A and B pulses shown will later be employed for describing the way in which the first and second outlets on a secondary switch may be discriminated from one another. A free path through the switching stages is indicated by the coincidence of pulses in all three pulse trains. In Fig. 8 this occurs in time positions 19 and 26. With the coincidence of the B pulse this is arranged to give a path-marking pulse. Although coincidence occurs in two time positions, one path-marking pulse only will be obtained, for the firing of the first free path tube, CT20, is arranged to prevent any other from firing. Also, since the testing starts at any random instant, it is possible for the later paths to be tested before the remainder, e. g. position 26 is tested before position 19. The free outlet pulses have been shown in one time scale, but it is possible to arrange that the testing of positions 17–32 could be coincident with the testing of positions 1–16.

Returning now to Fig. 7, the terminal SL1 receives the secondary switch pulse train peculiar to the tube CT16 and MR38 is blocked whenever a pulse is present. Rectifier MR39 is blocked owing to the tube CT16 being in a conducting stage. A positive potential is applied over R27, MR40 and R28 to trigger tube CT17 whenever a pulse is present on SL1. A continuous positive pulse train, applied to terminal Q from source CPS, (Fig. 11), deionises CT17 subsequent to each initiation of a discharge.

The tertiary pulse train from the scanning circuit TSC associated with the tertiary switches appears at the terminal TL1, a pulse condition blocking rectifier MR41. The tube CT15, conducting, blocks rectifier MR42, so that a triggering potential is applied to CT18 over R30, MR43, and R31. CT18 fires on the presence of a pulse on terminal TL1 and is extinguished in like manner to CT17.

The primary pulse train from the scanning circuit PSC, (Fig. 3), is switched through to ET over contact 3 of switch ARS (Fig. 3), resistance R32 (Fig. 5B), rectifier MR44, terminal CL6 (Fig. 5B), to trigger the gas tube CT19 through R33 (Fig. 7). CT19 is deionised in the pulse intervals via the pulse train present at the point Q. It will be appreciated that the switch ARS (Fig. 3) has contacts associated with CC and therefore with the particular primary switch in use.

Each of the tubes CT17 to CT19, on firing, blocks its associated rectifier MR45 to MR47, so that one of thirty-two tubes, corresponding to the thirty-two possible paths, will trigger. This tube CT20, as shown, fires when CT17, 18 and 19 are simultaneously conducting. The path through which the tube CT20 is triggered is opened when a pulse from the pulse generator of Fig. 11 in one of the thirty-two time positions is present at the terminal PT1.

Thus each of the thirty-two tubes CT20 has a different one of 32 pulses on its terminal PT1, and in the event all paths are free, all the tubes would fire in succession. However, current flowing through the first CT20 tube to fire reduces the anode supply potential to the other thirty-one tubes by means of the common anode-cathode resistance R35, R34, ensuring that no other tube can be struck. The positive potential across R35 in combination with the pulse on PT1 triggers the common amplifying gas tube CT21. Deionisation of CT21 is effected similarly to CT17, 18 and 19. The pulse appearing across R36 is used to establish the correct connection through P, S and T switches in a manner to be explained.

(5) *Setting up of primary, secondary and tertiary switches*

The tertiary operating circuit TOC is shown in Fig. 9. The request potential from ET appeared at terminal RR1 (there being one such terminal and each of the tubes CT16) and triggered the gas tube CT22 when rectifier MR48 was blocked by a potential appearing on the appropriate cathode of tube MCT5 which operates in the same way as previously described associator gas tubes. Tube CT23 which is normally conducting is extinguished by the tube CT22 on firing. The latter is one of a group of such tubes each individual to a particular CT16 tube and therefore representative of a particular group of secondary outlets. Relay PS operates in series with the main gap of CT22, connecting battery to the two gas discharge tubes, CT24 and CT25, over *ps*1 up, and the path-marking pulse at CL5 (Fig. 7) over *ps*2 (Fig. 9) up, to the trigger electrodes of CT24 and CT25. Two rectifiers MR49 and MR50 are alternately blocked by the A and B pulses, previously mentioned in connection with Fig. 8. In this way either CT24 or CT25 is fired, dependent upon whether the path-marking pulse is present in the A or B pulse period. Either relay TA or TB operates.

Referring now to Fig. 10 and recalling the switch interconnections detailed in Fig. 2 it will be clear that a particular primary outlet is always associated with one secondary inlet and similarly a secondary outlet with a tertiary inlet. Hence their respective magnets may be wired in series e. g. a secondary outlet magnet SOM with a tertiary inlet magnet TIM. The primary-secondary group relay PS (Fig. 9) connects battery (Fig. 10), over *ta*1 up or *tb*1 up and *ps*3 up or *ps*4 up, to the group of magnets associated with the outlets leading to the particular tertiary group. The operation of TA or TB determines the alternative secondary switch outlets. The path-marking pulse on terminal CL5 of Fig. 5B is applied over R37 and MR51 and contact 6 of switch ARS (Fig. 3) to terminal PMP1 and thence to terminal PMP1 of Fig. 10 and to the gas tubes associated with the primary outlet magnets POM of the primary switch concerned. One of thirty-two time position pulses is applied to the terminal PT1 (Fig. 10) blocking rectifier MR52, so allowing the particular primary outlet tube CT26 to fire when the path-marking pulse is present. A chain of primary outlet and secondary inlet magnets POM and SIM, respectively, and secondary outlet and tertiary inlet magnets SOM and TIM, respectively, appropriate to the path required, is operated via the tube CT26, the make contact of the appropriate PS relay, and a contact either of TA or TB.

In Fig. 7 it will be seen that the path-marking pulse obtained from CT21 appears at terminal TO1 due to the blocking of rectifier MR53 by the positive potential on the cathode of CT15. This tube is one of a hundred such and is representative of a particular finals group, so that a pulse from TO1 may be taken to one of sixteen gas tubes, such as CT27 (Fig. 10), which operate all the tertiary outlet magnets TOM controlling outlets leading to the final selector group number 1. This group includes the number 1 outlet of each of the tertiary switches 1 to 16 in the first group of tertiary switches. These tubes are scanned by pulses PT1 to PT16 which are applied respectively to rectifiers connected to the control electrodes of the tubes from the pulse sources of Fig. 11. The particular tube CT27 is selected for operation because the pulse time position fed thereto over PT1 is coincident with the path-marking pulse appearing at TO1. CT27 operating, in turn operates TOM over $ps5$ up.

The contact $ps6$ up operated the primary inlet magnet PIM over contact 4 of switch ARS (Fig. 3) and contact $bu3$ up (Fig. 5B) when relay PS operated. The contacts $ps6$ of all PS relays are connected in parallel so that any PS relay will operate the PIM magnet. This completes the operation of the six magnets necessary to extend the calling line through to the finals group. The hold circuit of the primary inlet is completed from earth (Fig. 3), $b5$ up, $pim1$ up, to the primary hold magnet PHM, and via contact 4 of the primary switch P to the secondary hold magnet SHM (Fig. 10) and via contact 4 of the secondary switch to the tertiary hold magnet THM.

The busying of the selected outlets is achieved by the operation of break springs on the hold magnets, as shown at the bottom of Fig. 10. The appropriate pulse time positions are supplied over terminals PT1 and led to commoned leads PL1, SL1, and TL1 (Figs. 10, 7 and 3) over suitable decoupling rectifiers.

Fig. 11 shows part of the pulse generator used for provision of the various pulses shown in Fig. 8. A number of multicathode tubes may be used in series and regular pulses supplied to the transfer electrodes at the supply point P from a source CPS of continuously repeated pulses. The pulses at individual time positions are taken from terminals PT1, PT2, PT3 ... PT32. PT1 to PT16 are led to a common lead AL through decoupling rectifiers to provide the A pulse, and the B pulse is similarly obtained from terminals PT17 to PT32.

(6) *Release of common equipment*

After operation of the P, S and T switches, earth is returned over the third contacts of the secondary and tertiary switches (Fig. 10) and the primary switch (Fig. 3) to operate relay CE (Fig. 3). $ce1$ up removes the request potential from TR1, whilst $ce2$ up releases the hold magnet HHM of the ARS switch, so returning ARS to normal.

Positive potential from R10 (Fig. 5B) is then applied through MR32, terminal RE3, to the electronic test circuit ET (Fig. 7) operating gas discharge tube CT28 through MR54. CT28, fired, charges condenser C6. The potential drop across R38 during the charging period of C6 deionises tubes CT15, CT16 and CT20. The resistance R39 is too high a value to allow the tube CT28 to sustain its discharge so that CT28 extinguishes.

The associator AT (Fig. 6) is released by the operation of CT14 from terminal RE3 and extinguishes CT13. This extinction starts MCT4 stepping again by operating CT30 again.

The tertiary operating circuit TOC (Fig. 9), is released by the same positive potential applied over RE3 through the resistance R40 (Fig. 7) to the gas tube CT23 (Fig. 9) over terminal RR3. CT23 firing extinguishes CT22 and operates CT31 and in consequence MCT5 recommences stepping.

On the release of ARS relay AR (Fig. 5B) falls back, releasing BU and thereby restoring the digit register to normal.

Relays A and CE in the call control circuit CC (Fig. 3) are held operated and further digits are received by the finals group.

FALSE CALLS

If there is no free path available through the P, S and T switches ET is released by the action of the tube CT29 (Fig. 7). The positive potential over $ps7$ up charges C7 through R41, thereby triggering CT29 after a predetermined time interval. The positive pulse which appears across R42 operates CT28 to reset ET, as already described. The pulse is also applied to CT9 (Fig. 5B) over terminal CL4. CT9, operated, extinguishes CT8, thereby extending busy tone BT to the calling subscriber over R43, MR55, contact 1 of switch ARS and the winding of the A relay. The negative extinguishing pulse on the anode of CT8 restores to normal MCT2 and MCT3 (Fig. 5A) through the resistance R44, condenser C8, by restriking the first gap. Interference on the leads CL1 and CL2 is thereby prevented. When the subscriber clears, relay A releases, B follows, ARS is released, and DR restores, as already described.

While the principles of the invention have been described above in connection with specific embodiments, and particular modifications thereof, it is to be clearly understood that this description is made only by way of example and not as a limitation on the scope of the invention.

What we claim is:

1. Automatic telecommunication switching equipment comprising a plurality of lines, a plurality of switching stages for establishing connections between calling and called lines, links connecting said switching stages, the connections of said links and switching stages being such that said links form the same predetermined number of paths between an inlet of the first stage and a group of outlets of the last stage, a plurality of digit registers, means for connecting a free register to a calling line and said calling line to an inlet of said first stage, means in said register responsive to signals from said calling line for registering the digits of a called line, electronic testing means, means for causing said registering means to set said testing means for concurrently testing the free or busy condition of the links between adjacent switching stages included in the predetermined number of paths between said calling line and a group of outlets to which the called line is accessible, and means in said testing means, responsive when the links which form a single one of said paths test free, for causing the switching stages to complete the connections of said path between said stages.

2. Automatic telecommunication switching equipment, as claimed in claim 1, in which the test means comprises means for generating time spaced pulses, means for assigning a different one of said pulses to each free link between adjacent switching stages forming the predetermined number of possible paths between said stages for a given connection, and the means in said testing means responsive when the links which form a single one of said paths test free comprises a coincidence circuit having an inlet for every two adjacent stages, and means for applying pulses to said respective inlets representative of the paths between said respective adjacent stages, said coincidence circuit adapted to respond when pulses appear simultaneously on said inlets thereof.

3. Automatic telecommunication switching equipment, as claimed in claim 2, further comprising an associator, means in said associator for successively connecting the registers to said associator, means in each register for transmitting a signal to said associator when the digits representative of a group of outlets of the last stage to which outlets the called line is available have been registered, means in said associator for receiving said signal only when the register producing said signal is connected thereto, means in said associator responsive to the receipt of a signal from a register for stopping said successive connecting means, means in said associator responsive to the signal from a register for transmitting a response signal to said register, and means in each register controlled by the digit registering means and responsive to a response signal received from said associator for transmitting signals to the testing means representative of the said group of outlets.

4. Automatic telecommunication switching equipment, as claimed in claim 3, in which the means for causing the switching stages to complete the connections of the tested path between the stages comprises a control circuit, a plurality of circuits in the testing means, each representative of a group of outlets of the last switching stage having access to the called line, means controlled by the registering means for selectively energizing one of said circuits, a second associator, means in said second associator for connecting said plurality of circuits successively to said second associator, means in each of said circuits for transmitting a signal to said second associator when said circuit is energized, means in said second associator for receiving said signal when said connecting means has connected said second associator to said energized circuit, means in said second associator responsive to said received signal for stopping said seccessive connecting means on said energized circuit, means in said second associator also responsive to said received signal for transmitting a response signal to said testing means, means in said second associator also responsive to said received signal for selectively setting said control circuit, and means in said testing means responsive to said response signal for operating said control circuit in accordance with its setting.

5. Automatic telecommunication switching equipment, as claimed in claim 1, in which the switching stages comprise primary, secondary, and tertiary stages, each having a plurality of switches divided into groups, each outlet of a switch of the primary stage being connected by means of a link to an inlet of a different switch of a group of switches in the secondary stage, and each switch of a group of switches in the secondary stage having two outlets connected by means of two links to two different switches of a group of switches in the tertiary stage.

6. An associator comprising a counting device having a plurality of outlets, means for producing a potential on said outlets successively as said device counts, means for normally causing the continuous operation of said device, an input and an output terminal for each outlet, a separate gating circuit for each outlet connecting said outlet with the associated input and output terminals, said gating circuit adapted to absorb a potential applied to said input terminal when no potential appears on the associated outlet of said counting device and to produce a potential on said output terminal when a potential appears on said associated outlet, and means connected to the gating circuit for stopping the operation of said counting device when potentials appear simultaneously on an outlet of said device and an associated input terminal.

7. An associator, according to claim 6, further comprising a separate control means for each gating circuit, and means for operating said control means when potentials appear simultaneously on the associated outlet and the associated input terminal.

8. An associator, according to claim 7, in which the counting device is a multi-electrode discharge tube and the plurality of outlets are the operating electrodes of said tube.

9. An associator, according to claim 6, in which the counting device is a multi-electrode discharge tube and the plurality of outlets are the operating electrodes of said tube.

10. An associator comprising a counting device having a plurality of outlets, means for producing a potential on said outlets successively as said device counts, means for causing the continuous operation of said device, an input and an output terminal for each outlet, and a separate gating circuit for each outlet connecting said outlet with the associated input and output terminals, said gating circuit adapted to absorb a potential applied to said input terminal when no potential appears on the associated outlet of said counting device and to produce a potential on said output terminal when a potential appears on said associated outlet.

References Cited in the file of this patent

UNITED STATES PATENTS

| Number | Name | Date |
|---|---|---|
| 2,291,036 | Hall | July 28, 1942 |
| 2,291,040 | Holden | July 28, 1942 |
| 2,299,898 | Holden | Oct. 27, 1942 |
| 2,303,356 | Holden | Dec. 1, 1942 |
| 2,310,452 | Meacham et al. | Feb. 9, 1943 |
| 2,315,705 | Holden et al. | Apr. 6, 1943 |
| 2,324,394 | Holden | July 13, 1943 |
| 2,326,478 | Meacham | Aug. 10, 1943 |
| 2,347,107 | Hubbard | Apr. 18, 1944 |
| 2,348,626 | Holden | May 9, 1944 |
| 2,566,063 | Johnson | Aug. 28, 1951 |
| 2,582,959 | Bruce et al. | Jan. 22, 1952 |
| 2,619,548 | Lesti | Nov. 25, 1952 |